July 20, 1965 R. SIEGEMUND 3,196,393

INPUT DEVICE FOR DATA PROCESSING SYSTEM

Filed Feb. 9, 1961

INVENTOR
RALF SIEGEMUND
BY Toulmin & Toulmin
ATTORNEYS

United States Patent Office 3,196,393
Patented July 20, 1965

3,196,393
INPUT DEVICE FOR DATA PROCESSING SYSTEM

Ralf Siegemund, Arlington, Va., assignor to Commonwealth Engineering Company of Ohio, Dayton, Ohio
Filed Feb. 9, 1961, Ser. No. 88,081
3 Claims. (Cl. 340—146.3)

Figures 1, 2, 3:
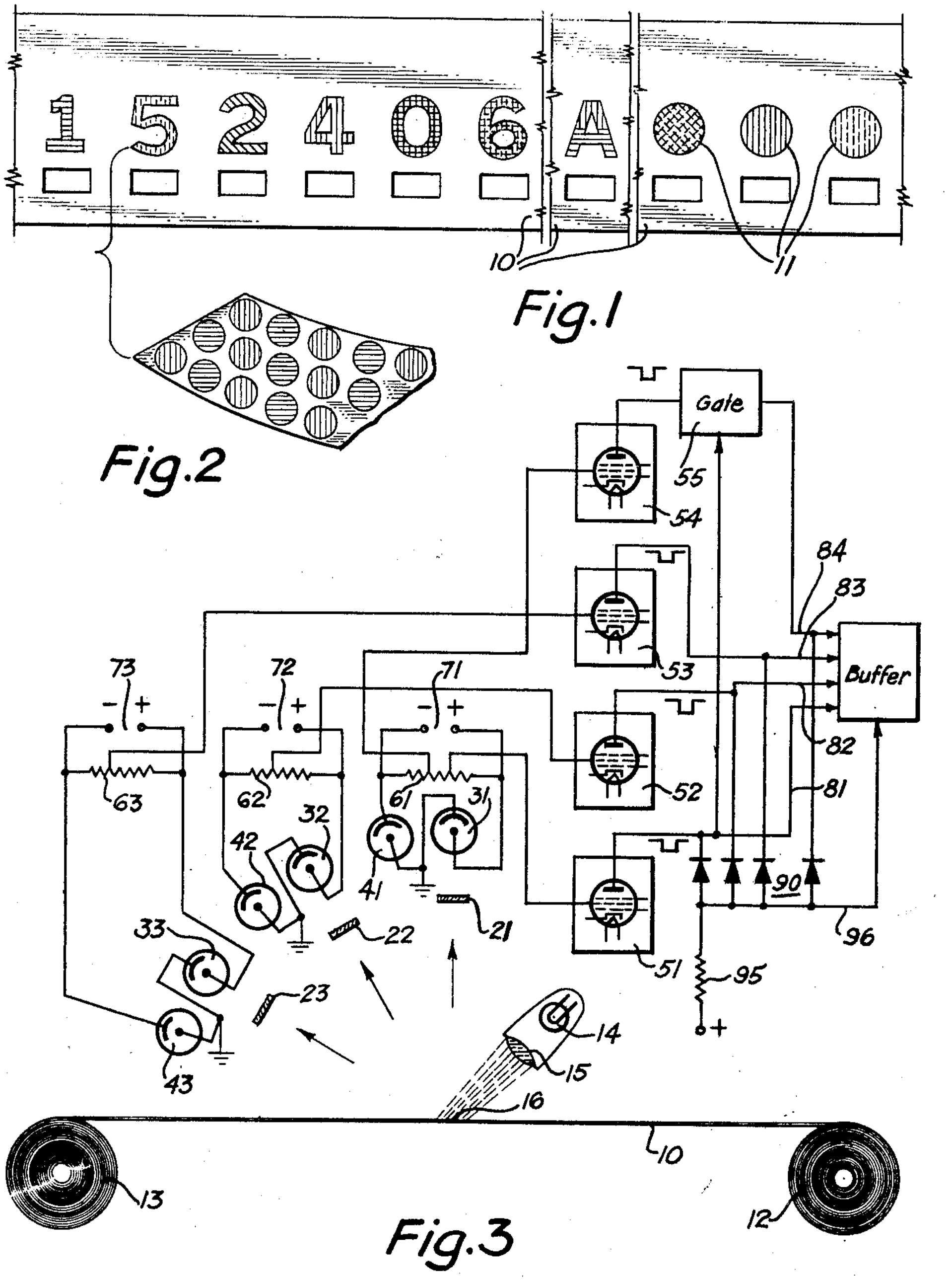

The present invention relates to an input device for data processing systems, and more particularly to a device in which recorded information is to be encoded so as to be suitable, immediately in a data processing system.

Recorded information for a data processing system has been stored and presented in various forms. For example, cards having punched holes or magnetic tape disc are commonly employed. In representing numbers such information usually is recorded in the decimal system. Digital computers mostly operate with a binary code; therefore, the input circuit for such computer usually includes a decimal-binary encoder.

It is a primary object of the present invention to provide a new input device for data processing systems in which the read-in device for the recorded information directly encodes such information.

It is another object of the present invention to provide for a new record carrier to be used in binary code data processing systems.

It is a feature of the present invention to present information on a record carrier in form of dots or areas of distinguished colors with a different color for each information character. It is another feature of the invention to encode such information in scanning such colors selectively so as to separate therefrom a limited number of code colors.

The principle of the present invention resides in that first a number of distinctive colors, to be called code colors, is selected. The data processing system has an equal number of code-color-detectors each one being separately and distinctly responsive to absence or presence of the code color in its detector range. The encoded information is stored in distinguishable colors on a record carrier with each information character being characterized by a mixture of the code colors. The code color detectors monitor these characters and separate the respective code colors whereby the specific combination of code colors represents the encoded information of the character monitored. In other words, the color distinguishing an encoded information character from other such characters can be considered as a specific and unique combination of code colors whereby the detectors of an input circuit produced this combination in the form of a recognizable signal combination.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGURE 1 is a top view of an information carrier illustrating various samples of stored uncoded information, FIGURE 2 illustrates an enlarged portion of FIGURE 1, and FIGURE 3 is a schematic circuit diagram of a read-in device employing the principles of the present invention.

In FIG. 1 there is shown an information carrier 10 in form of a tape, for example an opaque, more or less white film strip. There are imprinted on this film strip 10 a series of equally spaced information elements or characters such as the digits 1, 5, 2, 4, 0 and 6.

It will be observed, that digit 1 is blue, digit 5 is violet, digit 2 is green, digit 4 is red, digit 0 is black and digit 6 is yellow.

While on one hand, each of these digits is clearly legible to a human operator, it represents, on the other hand, a color information regardless of the particular shape the colored area has. It will become more apparent later in this specification that preferably the surface areas alloted to each digit are of similar size.

Reference numeral 11 denotes simple dots, i.e. a track of equally spaced dots, appearing in various character colors composed also of a smaller number of code colors. Of course, there can be several parallel tracks on such tape.

For the purpose of the present invention, it will be understood that one needs ten colors to represent the digits 0, 1, 2, 3, 4, 5, 6, 7 , 8 and 9. According to the principle of the present invention these ten colors shall be presented at least partially as mixed colors of a number of code colors taken from a number of colors of not more than the number of code digits. Thus, in case of ten different colors representing the digits 0 to 9, one can use four different code colors out of which each of the ten colors is mixed, where the four colors i.e. their presence or absence in any of the ten colors represents the binary code for each digit.

Inasmuch as it is simpler to use only the three commonly used primary colors with different proportions of each in the ten colors, one can, for example, use blue and green and two differently saturated reds.

Assuming, for example that "color" be understood in IC1 units, this is to be preferred because standardized electrical circuit elements, optical and electro-optical elements can readily be used.

The following table illustrates an example, which color each of the digits 0 to 9 is to represent (vertical) and out of which these colors are mixed with the "code" colors yellow, blue, red 1 and red 2. Red 1 and red 2 are to be understood that red 1 has a lesser white content than red 2.

Furthermore, in the table, digit 1 means, presence of the code color referred to on top of the respective column; digit 0 means absence of such color.

| | Red 1 | Red 2 | Green | Blue | |
|---|---|---|---|---|---|
| 0 | 1 | 0 | 1 | 1 | Black. |
| 1 | 0 | 0 | 0 | 1 | Blue. |
| 2 | 0 | 0 | 1 | 0 | Green. |
| 3 | 0 | 0 | 1 | 1 | Blue-green. |
| 4 | 0 | 1 | 0 | 0 | Light red. |
| 5 | 0 | 1 | 0 | 1 | Violet. |
| 6 | 0 | 1 | 1 | 0 | Yellow. |
| 7 | 0 | 1 | 1 | 1 | Pink or olive green. |
| 8 | 1 | 0 | 0 | 0 | Dark red. |
| 9 | 1 | 0 | 0 | 1 | Purple. |

It is readily apparent, that in this way the character color of each decimal digit is defined by a color adding of code colors, when presence of a code color is associated with binary digit 1. This is to be understood that such character as imprinted on a carrier modifies illuminating light so that reflected or transmitted light includes the code colors as predominate wave lengths only. Alternatively, of course, one can operate with color subtraction and reverse the effective character—photocell interaction.

According to the above given table, digit 5, for example, is presented in the binary code 1010; in terms of color, a violet-colored area is to represent 5 i.e. violet is the character color of decimal digit 5; when color selectively monitored, this violet area is to show: no red 1, red 2, no green, blue; this is the color-code of the binary code 1010.

For the purposes of the invention it is now sufficient, if, for example, while standard white light is directed towards the carrier, either the reflected light or the transmitted light of this area appears violet by color addition or subtraction, separable by filters for example of standard type into a blue component and a red component. By way of a simple illustration, FIG. 2 shows that the figures may be printed by a three-color printing process, with red and blue spots being printed in case of a "five," so that reflected light from such area has a blue and a red component.

The carrier 10 was assumed to be opaque, and the colors of the characters thereon are produced by reflection. In this case red 1 and red 2 as defined above can simply be distinguished in that red 1 has twice the number of red-reflecting spots than in case of red 2; the white background of the carrier thus changes the white content of the reflected light of the character and its immediate environment.

Turning now to FIG. 3, there is first shown again the carrier 10, which is unwound from a reel 12 and rewound on a reel 13 in a conventional manner. There is a light source 14 and a lens system 15 producing a bright light spot 16 on film 10. Film 10 is opaque as stated above; thus, not only the dots, digits, etc. thereon reflect light but also the "white" film surface. When film 10 runs, the light dot describes a path thereon and this path is to run along and over the information characters digits on film 10.

There are provided three filters, 21, 22 and 23 in the path of the reflected light rays from spot 16. Each filter screens a photocell 31, 32, and 33 respectively. For example, filter 21 is an absorption filter, blocking the transmission of all red, filter 22 absorbs all blue, filter 23 absorbs all green.

Alternatively, of course, one could use color sensitive photocells.

One has to consider, as stated, that some light from the environment of any directly colored i.e. dyed area passing through light spot 16 will be reflected. Thus, the reflected light is mixed with more or less "white" light. Therefore the filters 21, 22 and 23 will not be able at anytime to block off completely all light, but it will be understood, that if a digit passes spot 16 with a green component, for example, such as digits 1, 3, 6 or 7, the light detected by photocells 33 is at a minimum. The electric detector circuit for photocell 33 therefore is to be adjusted so as to produce an "output" only in case of the occurrence of such minimum. If one uses, for example, a pentode amplifier biased to saturation if light of an intensity larger than the thus defined minimum is detected by photocell 33, this light minimum then reduces the anode current below saturation and a negative pulse appears in the output anode circuit of the pentode.

53 is for example such amplifier having a suitably biased pentode of common design, having an output line 83. Such amplifier circuits are conventional and need no further explanation.

52 is a similar amplifier producing a negative pulse in its output line 82 in case there is present a blue component in a passing information dot whereby filter 22 screens off a maximum amount of light for photocell 32, thus detecting a minimum.

There are shown furthermore photocells 42 and 43 connected in series with photocells 32 and 33, respectively, with the junction being grounded. A tapped resistor 63 completes a bridge circuit for the blue-detector channel, and a tapped resistor 63 completes a bridge circuit for the green-detector channel. These photocells 42 and 43 are color insensitive, and not screened by any filter, and they serve to balance any brightness deviations in the light source, or voltage variations of the supply source etc. The bridge circuits as defined are biased by voltage sources 72 and 73, respectively.

Thus, it will be apparent, that negative pulses appear at the output lines 82 and 83 only in case an information character area passing under spot 16 has a blue and/or a green component, respectively.

As to the red channel, there is also provided a second photocell 41 and a resistor 61 completing a bridge circuit together with a voltage source 71. There are two amplifiers 51 and 54 rendered differently sensitive, but they are of a similar type as amplifiers 52 and 53.

From the definition of red 1 and red 2 above, it will be apparent, that in case red 1 is present in a character color, absorption filter 21 permits less light to pass than in case of red 2 because in the latter case more reflected white light from the carrier surface is reflected. Thus, when a character passes having red 1 component, a deeper light minimum than in case of red 2 is detected by photocell 31. This phenomenon is to be used to distinguish between red 1 and red 2.

It will be apparent that the anode current of amplifier 54 will fall below saturation at a weaker red (red 2) i.e. while the anode current of amplifier 51 will fall below saturation at a more expressed light minimum associated with red 1 appearing as having a smaller "white" content. In case of red 1, of course, amplifier 54 will respond also, but its output is blocked in having the output of amplifier 51 closing a gate for the output of amplifier 54. This gate is designated with reference numeral 55, and is of conventional design. Lines 81 and 84 designate the effective output channel lines of amplifiers 51 and 54, respectively.

The pulses appearing in lines 81 to 84, therefore represent in a binary code the digits or digit-representing-dots on carrier 10. There is no need for an encoder because the the color selective detector device described thus far draws whatever code information is present from the color of any colored area on carrier 10.

There is furthermore shown a logic "or" circuit 90 being comprised of four diodes 91 to 94 and a resistor 95. In output line 96 of "or" circuit 90 a pulse will appear whenever any colored area passes through spot 16. If, for example lines 81 to 84 terminate in a buffer storage, the pulse in line 96 can be used to shift the register, or to perform any other kind of control function, so that every combination of bit information appearing in lines 81 to 84 can be duly distinguished from the preceding and succeeding combination.

From the foregoing, it will be appreciated that with a device of the type shown in FIG. 3, all kinds of colored dots can be used on a single track of a storage carrier; each dot being composed of one or more of a selected number of code colors.

It will be further comprehended that the specific example of the invention described is but one possibility of color-code, and color-uncoded character association. It will be appreciated that full use can be made in distinguishing colors by predominate wave length or hue and also by saturation. The utilization of black and white spots can enhance such distinction and increase the sensitivity of the code color detector circuits.

Turning back again to FIG. 1, there is shown also the letter "A" imprinted. It will readily be apparent, that each letter of the alphabet can be represented by a spatial separated combination of two character colors. If only five code colors are used, already twenty-five letters can be represented.

It will further be understood that other types of carriers can be used, for example cards, etc., having characters such as illustrated by way of example in FIG. 1 imprinted wherever necessary. While conventional record cards always have printed and supposedly legible information, punched holes were needed for processing purposes mutilating the printed information. A card with colored characters as shown in FIG. 1 is not only undisturbed legibly but also presents an inherently binary-color code for data processing.

The invention is not limited to the embodiments described above but all changes and modifications thereof not constituting departments from the spirit and scope of the invention are intended to be covered by the following claims:

What I claim is:

1. Input device for digital computers comprising: a carrier for encoded information having at least one track of equally spaced colored character areas selected from a group of ten colors, each color representing a decimal digit; three photoelectric detectors individually responsive to three primary colors of said areas on said carrier; circuit means for deriving two signals from respective two of said detectors; and circuit means for deriving a third and a fourth signal at respectively different output levels from the third detector.

2. Input device for digital computers comprising: a carrier for information characters printed thereon as colored area, the color of every particular information character being a distinctive combination of selected code colors, including primary colors at various white contents; photoelectric detector means individually responsive to the primary color content of said areas, one of said detectors having first and third output channels producing first and second signals at first and second detector response levels, respectively, and circuit means connected to said second channel for suppressing said second signal in response to said first signal.

3. A decimal-binary-read-in and conversion system comprising: a storage carrier having imprinted numbers including the digits 0 to 9, each one being represented by a different color; two photoelectric detectors, respectively responsive to the occurrence of two primary colors on said carrier above a predetermined response level; photoelectric detector means having two output channels, a first one thereof being responsive to the third primary color above a predetermined response level, and producing a first signal in response thereto, the second channel producing a second signal when the intensity sensed by said third detector exceeds another response level; and circuit means for blocking said first signal in response to said second signal.

References Cited by the Examiner

UNITED STATES PATENTS

| | | | |
|---|---|---|---|
| 1,782,046 | 11/30 | Mayberry et al. | 283—47 |
| 2,185,233 | 1/40 | Stuart | 235—61.11 |
| 2,268,498 | 12/41 | Bryce | 235—61.11 |
| 2,675,422 | 4/54 | Bedford | 178—5.4 |
| 2,760,404 | 8/56 | King | 235—61.11 |
| 2,834,005 | 5/58 | Ketchledge | 340—149 |
| 3,144,510 | 8/64 | Farber | 178—5.2 |

MALCOLM A. MORRISON, *Primary Examiner.*

NEIL C. READ, *Examiner.*